(12) United States Patent
Hanel et al.

(10) Patent No.: US 9,728,094 B2
(45) Date of Patent: Aug. 8, 2017

(54) REDUNDANT DETERMINATION OF POSITIONAL DATA FOR AN AUTOMATIC LANDING SYSTEM

(71) Applicant: Airbus Defence and Space GmbH, Ottobrunn (DE)

(72) Inventors: Martin Hanel, Ingolstadt (DE); Christoph Stahl, Karlskron (DE); Winfried Lohmiller, Freising (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 348 days.

(21) Appl. No.: 14/865,599

(22) Filed: Sep. 25, 2015

(65) Prior Publication Data

US 2016/0104384 A1    Apr. 14, 2016

(30) Foreign Application Priority Data

Sep. 26, 2014   (DE) .................. 10 2014 014 446

(51) Int. Cl.
  *G06F 19/00*     (2011.01)
  *G08G 5/02*      (2006.01)
  (Continued)

(52) U.S. Cl.
  CPC .......... *G08G 5/025* (2013.01); *G01C 21/005* (2013.01); *G01S 13/02* (2013.01); *G01S 19/13* (2013.01); *G05D 1/0676* (2013.01)

(58) Field of Classification Search
  CPC ...... G08G 5/025; G01C 21/0005; G01S 19/13
  See application file for complete search history.

(56) References Cited

U.S. PATENT DOCUMENTS 6,178,363 B1    1/2001   McIntyre et al.
7,546,183 B1    6/2009   Marcum
(Continued)

FOREIGN PATENT DOCUMENTS

DE    41 40 406 A1    6/1993
DE    195 21 600 A1   12/1996
EP    1 014 104 B2    3/2012

OTHER PUBLICATIONS

European Search Report issued in European counterpart application No. 15 00 2625 dated Mar. 8, 2016, with Statement of Relevancy (Two (2) pages).

*Primary Examiner* — Ian Jen
(74) *Attorney, Agent, or Firm* — Crowell & Moring LLP

(57) ABSTRACT

An automatic landing system contains a control device for providing positional data for controlling an aircraft, a first position or range measuring device for detecting first positional data of the aircraft, a second position or range measuring device for detecting second positional data of the aircraft, and a sensor device for detecting sensor data from which a direction in which a landmark is located and/or a distance of the landmark to the aircraft can be determined. The control device may be configured to generate, based on the first positional data, a first hypothesis for the direction and distance of the landmark and, based on the second positional data, a second hypothesis for the direction and distance of the landmark. Moreover, the control device may be configure to confirm or discard the first hypothesis and the second hypothesis, respectively, using the sensor data detected by the sensor device.

20 Claims, 3 Drawing Sheets

(51) Int. Cl.
*G01C 21/00* (2006.01)
*G05D 1/06* (2006.01)
*G01S 13/02* (2006.01)
*G01S 19/13* (2010.01)

(56) References Cited

U.S. PATENT DOCUMENTS

| | | | |
|---|---|---|---|
| 9,317,040 B1* | 4/2016 | Hilde | G05D 1/042 |
| 9,377,782 B2* | 6/2016 | Puyou | G08G 5/025 |
| 2003/0066932 A1 | 4/2003 | Carroll | |
| 2005/0125142 A1 | 6/2005 | Yamane | |
| 2008/0077284 A1 | 3/2008 | Swope | |
| 2009/0043504 A1* | 2/2009 | Bandyopadhyay | G01C 17/38 701/469 |
| 2012/0261516 A1* | 10/2012 | Gilliland | G01S 17/107 244/183 |
| 2016/0034607 A1* | 2/2016 | Maestas | G06T 7/73 701/16 |
| 2016/0259333 A1* | 9/2016 | Ducharme | G05D 1/0676 |

* cited by examiner

REDUNDANT DETERMINATION OF POSITIONAL DATA FOR AN AUTOMATIC LANDING SYSTEM

CROSS REFERENCES TO RELATED APPLICATIONS

This application claims priority under 35 U.S.C. §119 from German Patent Application No. 10 2014 014 446.1, filed Sep. 26, 2014, the entire disclosure of which is herein expressly incorporated by reference.

FIELD OF THE INVENTION

The invention relates to the redundant determination of positional data for automatic landing systems of aircraft. In particular, the invention relates to an automatic landing system for an aircraft, a drone with an automatic landing system and a method for determining positional data of an aircraft for an automatic landing system.

BACKGROUND

Today, manned and unmanned aircraft can be equipped with automatic or semiautomatic landing systems. To control the approach for landing, automatic landing systems can determine the distance of the aircraft from the intended landing point, for example from a positional or range measurement. With the aid of the distance parameters and other measured variables, such as flight velocity, for example, flight control commands can be generated and the autopilot controlled such that the aircraft sets down at the landing point.

Automatic landing systems for manned aircraft are usually equipped with rangefinders with a high level of integrity and precision. If the landing system is not available or is faulty, the pilot can perform a manual landing there or at an alternate aerodrome (alternate). In unmanned aircraft, in the event of an error in the automatic landing system, the landing can be performed via manual or direct control commands that are transmitted by data link to the aircraft.

SUMMARY OF THE INVENTION

It is an object of the invention to improve the automatic landing of aircraft.

The object is achieved by the subject matter of the independent claims. Developments and embodiments can be derived from the dependent claims, the following description and the figures.

According to one exemplary embodiment, the invention relates to an automatic landing system for an aircraft. The automatic landing system contains a control device for providing positional data for controlling the aircraft, a first position or range measuring device for detecting first positional data of the aircraft, a second position or range measuring device for detecting second positional data of the aircraft, and a sensor device for detecting sensor data from which a direction in which a landmark is located and/or a distance of the landmark to the aircraft can be determined. The control device is designed to generate, based on the first positional data, a first hypothesis for the direction and distance of the landmark and, based on the second positional data, a second hypothesis for the direction and distance of the landmark. Moreover, the control device is designed to respectively confirm or discard the first hypothesis and the second hypothesis using the sensor data detected by the sensor device. The control device is also designed to decide that only the positional data of the aircraft are to be used on which a confirmed hypothesis is based.

In the context of the invention, an aircraft can be understood as being a manned or unmanned aircraft. For example, the aircraft can be an airship, a rotary wing aircraft, an airplane or a drone. The automatic landing system can refer to a system for automatically controlling an approach for landing of the aircraft that requires no human intervention.

The control device (control and decision-making unit E) can be designed for redundant determination of the position or range of the aircraft. In other words, the control device can be designed to select positional data from at least two independent positional data and to use the selected positional data to control the aircraft or transmit it to a flight control system.

The first position or range measuring device (position meter or rangefinder S) and the second position or range measuring device (position meter or rangefinder B) can each be designed to determine a position of the aircraft. The determined positional data can contain the three-dimensional position of the aircraft, e.g., the spatial coordinates of the aircraft or a distance, an azimuth angle or an elevation angle with respect to a landing site. For example, the first and/or second positional data can define an absolute position of the aircraft or a relative position of the aircraft to a landing site. For example, the positional data or the absolute position can be defined in or converted to the coordinates of World Geodetic System 1984 (WGS84).

The sensor device (sensor O) can be designed to detect sensor data that enable conclusions to be drawn regarding a direction or a range of a landmark. In the context of the invention, a landmark can also be understood as a characteristic place whose absolute position or characteristics relative to the intended landing point can be known to the control device. For example, the landmark can be a geographic object that is recognizable by means of image processing or signal processing. For example, the landmark can be a landing strip or an air traffic control tower sein that stand out from the surroundings such that they can be recognized from an image from a camera by means of image recognition. The landmark can also be a signal source, for example a light, radio or radar source, that can be recognized by means of a camera or a radio or radar receiver of the aircraft.

The first position or range measuring device, the second position or range measuring device and the sensor device can be independent of one another. That is, each of these devices can determine the associated data independently of the other devices. Moreover, the first and second position or range measuring device and the sensor device can be functionally connected to the control device.

The first and second hypothesis can each be generated based on the absolute position of the landmark. For this purpose, the absolute position of the landmark can be known to the control device. For example, the control device can access digital map data in which the absolute positions of landmarks are stored.

By means of the positional data, a direction or a range of the landmark can be determined. Using the determined direction or range, the first hypothesis for the direction or range of the landmark can then be confirmed or discarded. The confirming or discarding of the hypotheses can be understood as different methods by means of which a choice is made between the two hypotheses. For example, a correlation can be respectively determined between the first and second hypothesis and the sensor data. Furthermore, it is also possible for both hypotheses to be confirmed (for example, if the first positional data and the second positional data differ little from each other), or both hypotheses can be discarded (for example, if the two hypotheses do not match with the sensor data). The confirmed positional data can then be transmitted to a flight control system in order to control the aircraft.

Through the confirmation or discarding of the hypotheses, at least one positional parameter of the first or second positional data can be confirmed or discarded, for example. The positional parameters can be a distance, an azimuth angle and an elevation angle, for example. For instance, the azimuth angle can be checked with the hypothesis for the direction of the landmark, and the distance can be checked with the hypothesis for the range of the landmark.

In this way, the landing system can determine the positional data of the aircraft in an automatic and redundant manner. High-integrity positional determination is thus provided for a landing system, thus improving the landing system overall. The invention also provides a landing system that still enables a safe automatic landing even in the case of an initial fault due to redundant system redundancy.

In other words, a first aspect of the invention relates to a redundant automatic flight landing system, having:
 a position or rangefinder S
  (for example, satellite-based: GPS/SBAS);
 a position or rangefinder B
  (for example, ground-based: radar tracker/laser tracker, ILS or MLS);
 a control and decision-making unit E, connected to an automatic flight control system of the aircraft F;
 an independent sensor O for measuring direction or range
  (for example, electro-optical camera);
 the position finder S, the rangefinder B and the sensor O with the decision-making unit E being functionally connected, so that
  a) the range and direction of the aircraft from the landing point and the altitude of the aircraft can be calculated from the measurements of S and B independently of one another (e.g., expressed by distance, azimuth and elevation angle);
  b) the unit E compares the two measurements; and
  c) the landing continues with a position signal generated appropriately from the two measured values if the two measured values differ by less than a predefined amount; or
  d) brings about an automatic decision between the sensors if the measured values differ by more than a predefined amount, as follows: the unit E generates hypotheses for the values of the two sets of range parameters from (a) hypotheses for characteristics of a characteristic location in relation to the landing point which can be confirmed or discarded using the results of a third independent measurement performed by the sensor O.

In other words, the invention can relate to a redundantly designed automatic landing system with two independent position and range sensors. The system can compare the two positional measurements. If the measurements match, the landing can be continued. If the positional measurements differ by more than a predetermined value, the landing system can automatically detect a measurement error and attempt to make an automatic decision between the first and second positional data.

In the context of the invention, the decision can be made by forming a respective hypothesis for the accuracy of the measurement from the measurement results of the two sensors independently of one another, which is confirmed or discarded by a third measurement with an independent sensor.

According to one exemplary embodiment of the invention, the control device for checking the first and second hypothesis is designed to determine a first correlation for the first hypothesis and the sensor data as well as a second correlation for the second hypothesis and the sensor data. Furthermore, the control device is designed to confirm the hypothesis that has a better correlation with the sensor data.

For example, a lateral correlation index can be determined for the hypothesis for the direction of the landmark and/or a range correlation index can be determined for the hypothesis for the range of the landmark. The control unit can be designed to confirm the hypothesis for which a greater correlation index was determined.

In this way, a mathematically precise method for confirming or discarding the hypotheses is made available.

A second aspect of the invention relates to a redundant automatic flight landing system according to the first aspect, wherein
 a) the sensor O is an imaging electromagnetic sensor (e.g., electro-optical camera for visible light or ultraviolet camera or infrared camera or radar receiver);
 b) the unit E generates, for each of the two sets of range parameters, according to the first aspect a), a hypothesis for the expected direction of a characteristic location in relation to the landing point;
 c) the sensor O collects images in the respectively calculated direction for each hypothesis, and the unit E uses an automatic image analysis to select the image having a better correlation for the characteristic location (e.g., higher lateral correlation index);
 d) the unit E selects the more appropriate signal for the landing with the aid of the lateral correlation according to the second aspect c).

In other words, a (direction) hypothesis can be calculated for the location of a characteristic image feature in relation to the theoretical landing point from the measurements of each of the two position sensors. Images in the respective directions of those locations can then be recorded using an electromagnetic receiver (visible, infrared, ultraviolet light or radar radiation).

Image processing algorithms can be applied to the images, each of which calculates a correlation index for the hypothesis of the characteristic image feature at the indicated position (example: If the characteristic image feature is the center of the landing strip, the hypothesis center of the landing strip is checked at that location).

If the parameters of one of the two position sensors can be confirmed by a high lateral correlation index, the automatic landing can be performed using the associated sensor. If there is no match, the landing can be aborted.

A third aspect of the invention relates to a redundant automatic flight landing system according to the first aspect, wherein
 a) the sensor O is a rangefinder;
 b) the unit E generates, for each of the two sets of range parameters, according to the first aspect a), a hypothesis for the expected range of a characteristic location in relation to the landing point;
 c) the rangefinder O determines the range of the characteristic location, and the unit E determines the set of parameters from the first aspect a) that matches best with the measured value of the rangefinder O (e.g., greater range correlation) with respect to the hypothesis for the range of the characteristic location;
 d) the unit E selects the more appropriate signal for the landing with the aid of the range correlation according to the third aspect c).

A hypothesis for the range of a characteristic location in relation to the theoretical landing point can then be calculated from each of the measurements of the two position sensors. During the landing, the range to this location can be measured and a correlation index calculated for the respective (range) hypothesis.

According to another exemplary embodiment of the invention, the direction in which the landmark is located and the range of the landmark to the aircraft can be determined from the sensor data. The first and second hypothesis are each a hypothesis for the direction and the range of the landmark.

In this way, two positional parameters of the first and second positional data can be checked, for example the azimuth angle and the distance. The reliability of the automatic and redundant positional determination can thus be improved.

According to another exemplary embodiment of the invention, the sensor device has a signal detection device for detecting electromagnetic signals of a signal source.

For example, the sensor device can have a radar receiver that is designed to determine a direction and/or range of a landmark with which the hypotheses can be confirmed or discarded. The sensor device can also have an ultraviolet camera and/or an infrared camera with which a direction of a landmark can be determined with a UV or IR source, whereby the hypotheses can be confirmed or discarded.

A fourth aspect of the invention relates to a redundant automatic flight landing system according to the first aspect, wherein
   a) the sensor O is an electromagnetic receiver (electro-optical camera for visible light or ultraviolet camera or infrared camera or radar receiver);
   b) the unit E generates, for each of the two sets of range parameters according to the first aspect a), a hypothesis for the expected direction of a predefined signal source in relation to the landing point;
   c) the receiver O records the radiation of the signal source and determines the direction of the signal source, and the unit E determines the set of parameters from the first aspect a) that matches best with the measured value of the receiver O (e.g., greater range correlation) with respect to the hypothesis for the direction of the signal source;
   d) the unit E selects the more appropriate signal for the landing with the aid of the lateral correlation according to the fourth aspect c).

In other words, a (direction) hypothesis can be calculated for the location of a known electromagnetic signal source in relation to the theoretical landing point from the measurements of the two position sensors. During the landing, the radiation of the signal source can be recorded with an appropriate electromagnetic receiver (visible, infrared, ultraviolet light or radar radiation) that determines the direction of the signal source, and a correlation index can be calculated for the respective hypothesis of the signal source at the expected location.

If the parameters of one of the two position sensors can be confirmed by a high lateral correlation index, the automatic landing can be performed with the associated sensor. If there is no match, the landing can be aborted.

According to another exemplary embodiment of the invention, the landing system also has an altitude measuring device for determining a flight altitude of the aircraft, the control device being designed to generate a third hypothesis for the flight altitude of the aircraft based on the first positional data and a fourth hypothesis for the flight altitude of the aircraft based on the second positional data. The control device is designed to confirm or discard the third hypothesis and the fourth hypothesis, respectively, with the flight altitude determined by the altitude measuring device. Moreover, the control device is designed to decide that only the positional data on which a hypothesis for the flight altitude of the aircraft that was confirmed during the check are used to control the aircraft.

The altitude measuring device can be a radar altimeter or a laser altimeter, for example. The altitude measuring device can determine the flight altitude independently of the other devices. For example, the elevation angle of the positional data can be checked by means of the altitude measuring device. In this way, the positional data can be checked by means of another independent device.

A fifth aspect of the invention relates to a redundant automatic flight landing system according to the first, second, third or fourth aspect, having
   an independent altimeter H
   (for example, radar altimeter/laser altimeter), wherein
   a) the unit E determines the set of parameters according to the first aspect a) that matches best with the measured value of the altimeter H with regard to altitude (e.g., greater altitude correlation)
   b) the unit E additionally selects the more appropriate signal for the landing with the aid of the altitude correlation according to the fifth aspect a).

For example, if the positional parameters of the two sensor differ with respect to flight altitude, a hypothesis for the altitude of the aircraft over the ground can be calculated from each measurement as a function of the aircraft position and correlated with the altitude information of an additionally installed altimeter (e.g., of a radar altimeter) (altitude correlation), and the more appropriate signal can be selected.

According to another exemplary embodiment of the invention, the control device is designed to compare the first positional data and the second positional data. Furthermore, the control device is designed only to decide which sensor data are not to be used to control the aircraft if the first positional data and the second positional data differ from one another by more than a predefined amount.

In other words, the control device can be designed to confirm or discard positional data only if the difference between the positional data exceeds a predefined threshold value. If this threshold value or predefined amount is not exceeded, an average of the two positional data or a certain set of the two positional data can be used to control the aircraft, for example.

According to another exemplary embodiment of the invention, the control device is designed to abort landing approach of the aircraft if, once the aircraft is below a predefined altitude, the first and second positional data differ from one another by more than a predefined amount and no decision has been made concerning the positional data to be used.

In other words, the predefined altitude can define a so-called decision window. The control device can be designed so as to abort the landing approach if, when passing through the decision window, no decision has yet been made concerning the positional data to be used and the positional data differ from one another by more than the predefined amount.

A sixth aspect of the invention relates to an automatic flight landing system according to the first, second, third, fourth or fifth aspect, wherein
   a decision window for aborting the landing is defined geometrically as the location at which the system automatically aborts the landing if a) the aircraft is located outside of the window; or b) there is not a sufficient match between the measurements of the position sensors; and in addition, it is not possible to calculate, for any of the two sets of positional parameters, i. a sufficient lateral correlation with the aid of the image sensor/receiver O (in the case of a system according to the second or fourth aspect); or ii. a sufficient range correlation with the aid of the rangefinder O (in the case of a system according to the third aspect); or iii. a sufficient altitude correlation with the aid of the altitude sensor H (in the case of a system according to the fifth aspect).

In other words, a decision window can be defined that establishes the location in which the landing system makes a decision regarding the aborting of the landing. The dimension of the window can be determined such that an aircraft that passes through the window will land on the landing strip with a very high degree of probability.

According to another exemplary embodiment of the invention, the first position or range measuring device is a satellite-based measuring device, preferably a GPS system, a GBAS system, or an SBAS system. Furthermore, the second position or range measuring device is a radar tracker or a laser tracker. The sensor device has an optical camera, an infrared camera, an ultraviolet camera and/or a radar receiver for generating images.

Furthermore, the second position or range measuring device can also be an instrument landing system (ILS) or a microwave landing system (MLS). Based on the images generated by the sensor device, the direction or range of the landmark can be determined.

According to another exemplary embodiment, the invention relates to a drone with a flight landing system described in the context of the invention.

According to another exemplary embodiment, the invention relates to a method for determining positional data of an aircraft for an automatic landing system of the aircraft. The method has the steps of detecting first positional data of the aircraft through a first position or range measuring device and detecting second positional data of the aircraft through a second position or range measuring device. Furthermore, the method comprises the detection of sensor data from which a direction in which a landmark is located and/or a distance of the landmark to the aircraft can be determined, through a sensor device. The method further comprises the generation of a first hypothesis for the direction or range of the landmark based on the first positional data as well as the generation of a second hypothesis for the direction or range of the landmark based on the second positional data. According to the method, the confirming or discarding of the first hypothesis and of the second hypothesis is done on the basis of the sensor data detected by the sensor device and the decision that only the positional data of the aircraft are to be used on which a confirmed hypothesis is based.

For example, the method can be executed by means of an automatic landing system described in the context of the invention. Furthermore, the method can also comprise additional steps which are described in the context of the landing system.

Additional features, advantages and possible applications of the invention follow from the following description of the exemplary embodiments and figures. All of the described and/or graphically illustrated features constitute the subject matter of the invention alone or in any combination, even independently of their composition in the individual claims or their back-references.

BRIEF DESCRIPTION OF THE FIGURES

The figures are schematic and not shown true to scale. If the same reference symbols are shown in the following description in different figures, they designate same or similar elements. However, same or similar elements can also be designated with different reference symbols.

DETAILED DESCRIPTION OF EXEMPLARY EMBODIMENTS

Figure 1:
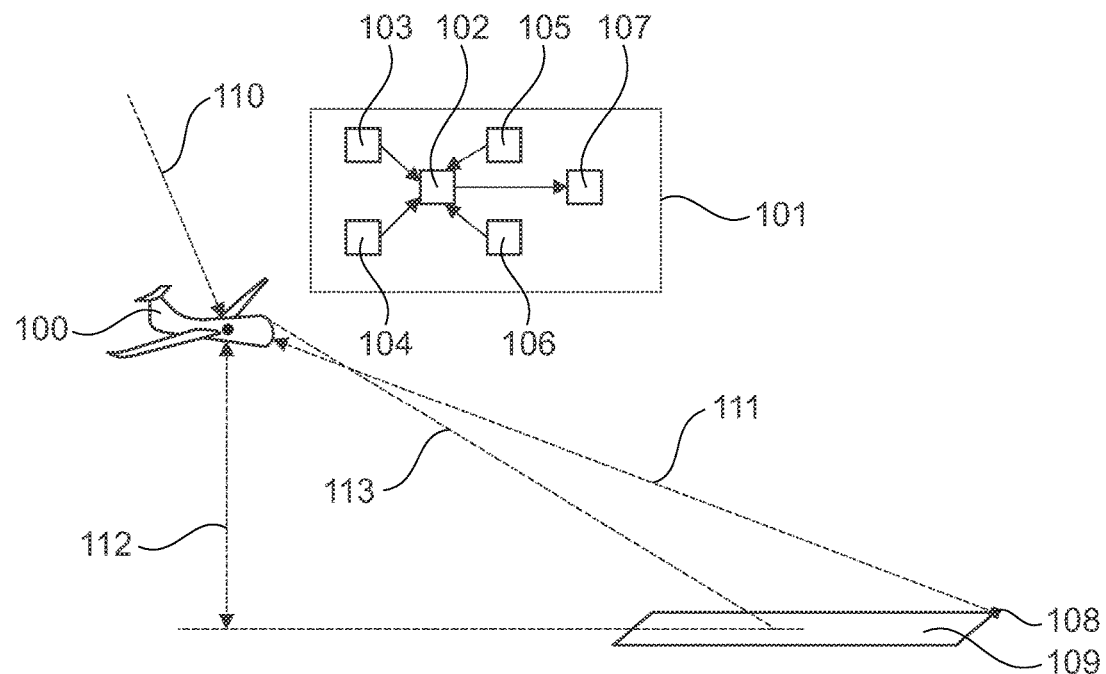
FIG. 1 shows an aircraft with an automatic landing system according to one exemplary embodiment of the invention, as well as a landing strip in a perspective view.

FIG. 1 shows an aircraft 100 with an automatic landing system 101 according to one exemplary embodiment of the invention. The aircraft 100 is an unmanned aircraft or a drone, for example. Furthermore, a landing strip 109 is shown on which the aircraft 100 is performing an automatic landing approach, the line 113 representing the ideal line of approach.

The automatic landing system of the aircraft comprises a control device 102, a first position or range measuring device 103, a second position or range measuring device 104, a sensor device 105, an altitude measuring device 106 and a flight control device 107. The landing system according to the invention can also only comprise the control device 102, the first position or range measuring device 103, the second position or range measuring device 104 and the sensor device 105.

The control device 102 to automatically and redundantly, and thus with a high level of integrity, determine the position of the aircraft 100. For example, the first position or range measuring device is embodied as a GPS or SBAS system that can determine the first positional data in the form of an absolute three-dimensional position 110 of the aircraft. The second position or range measuring device 104 is embodied as a radar tracker or laser tracker, for example, and can determine second positional data in the form of distance, azimuth angle and elevation angle 111 with respect to a base station 108.

If these first and second positional data differ from one another by more than a predefined amount, the control device 102 can select positional data of these first and second positional data 110 and 111 for further use for controlling the aircraft 100. For this purpose, the control device is designed to generate a first hypothesis for a direction or range of a landmark and a second hypothesis for a direction or range of the landmark. For example, the landing strip 109 can be the landmark. Other landmarks are also possible, however, e.g., an air traffic control tower. The control device can confirm or discard each of these sensor data detected by the sensor device 105. Furthermore, the control device 102 can also be designed to generate a hypothesis for the direction and the range of the landmark, respectively, and to confirm or discard them.

For example, the control device 102 can determine a first correlation for the first hypothesis and the sensor data and a second correlation for the second hypothesis and the sensor data, the hypothesis being confirmed with the better correlation. For example, the positional parameter relating to the azimuth angle of the aircraft 100 can be checked using a hypothesis for the direction of the landmark 109, and the positional parameter relating to the distance of the aircraft 100 can be checked using a hypothesis for the range of the landmark.

The altitude measuring device 106 of the landing system is designed to determine a flight altitude 112 of the aircraft. Based on the first and second positional data 110 and 111, the control device 102 can generate third and fourth hypotheses for the flight altitude, which can be confirmed or discarded by means of the flight altitude determined by the altitude measuring device 106 in order to provide a second independent check of the positional data. It is possible to use the altitude measuring device 106, for example, to check the positional parameter relating to the elevation angle of the aircraft. It is thus possible to check one, two or three positional parameters of the positional data.

The confirmed positional data from the first and second positional data are subsequently forwarded by the control device 102 to the flight control device 107. As described, the flight control device 107 can be a part of the landing system 101. Alternatively, the flight control device 107 can also be part of another system, which is not explicitly shown here, however.

Figure 2:
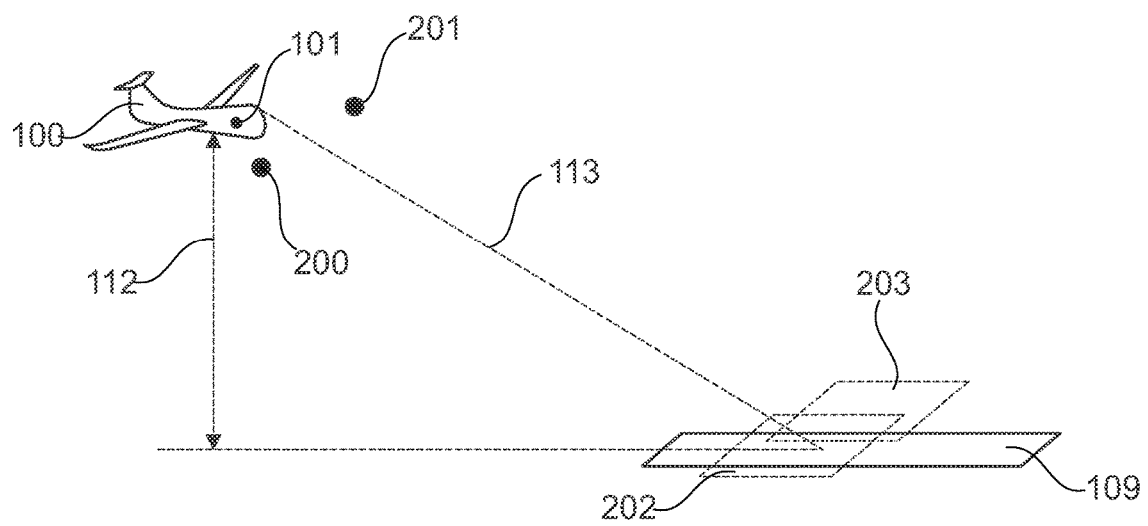
FIG. 2 shows an aircraft with an automatic landing system according to one exemplary embodiment of the invention, as well as a landing strip in a perspective view.

FIG. 2 shows an aircraft 100 with an automatic landing system 101 according to another exemplary embodiment of the invention. The automatic landing system 1 is described in detail in FIG. 1, for example. A landing strip 109 and an ideal line of approach 113 are also shown.

The control device of the landing system is designed to determine first positional data 200 and second positional data 201 on the basis of the first and second position or range measuring devices. As is shown in FIG. 2, the first and second positional data 200 and 201 differ clearly from each other. In order to select a set of positional data from the first and second positional data for further use for controlling the aircraft 100, the control device of the landing system 101 is designed to generate a first hypothesis and a second hypothesis for a direction of a landmark, e.g., the landing strip 109. In order to check and either confirm or discard these first and second hypotheses, the control device is designed to generate a first image 202 along the direction defined according to the first hypothesis and a second image 203 along the direction defined according to the second hypothesis by means of the sensor device, which is embodied in this case as an imaging sensor device, as an optical camera, ultraviolet camera or infrared camera. Using image analysis, the control device can check whether the landmark or landing strip 109 is located in the first image 202 or the second image 203. In this case, the landmark or landing strip 109 is located in the first image 202, so that the first hypothesis is confirmed and the first positional data 200 are used for controlling the aircraft 100 and transmitted to the flight control system.

Landing strips can be characterized in that the edge of the landing strip is clearly distinguishable from the landing strip shoulder or that the latter is appropriately marked. Image processing methods can detect symmetries in images, for example. If the landmark is the landing strip, and if it is known how the landing point lies relative to the center of the landing strip (for example, in the center of the landing strip), then a first hypothesis for the position of the center of the landing strip in the first image 202 and a second hypothesis for the position of the center of the landing strip in the second image 203 can be calculated, and the two images can be examined for symmetrical features such as those which typically occur at the landing strip edge.

Figure 3:
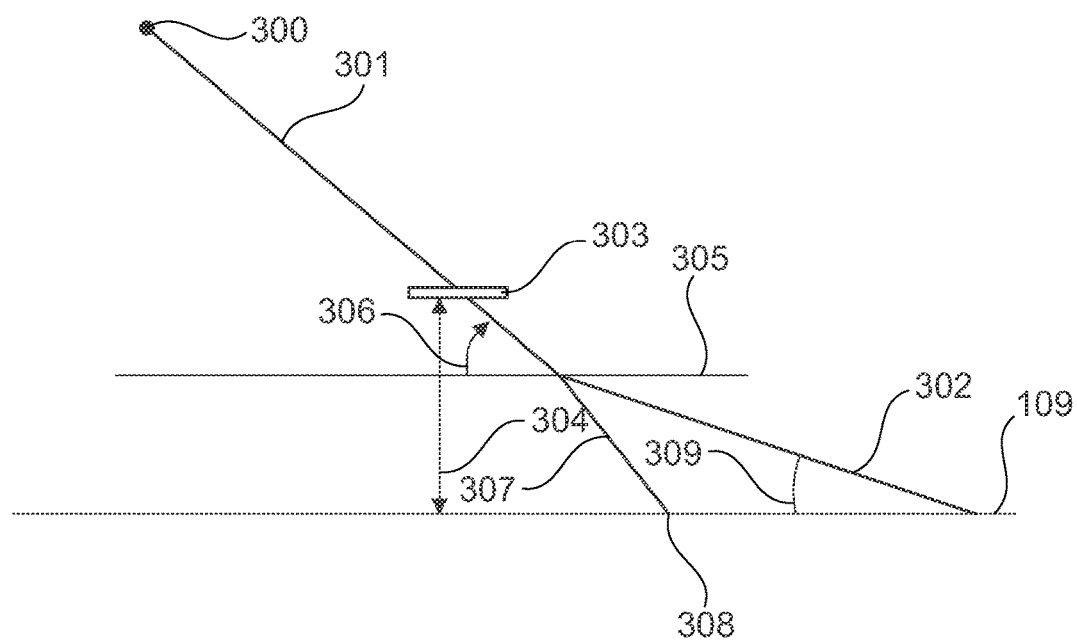
FIG. 3 shows a position of an aircraft according to one exemplary embodiment of the invention, as well as a landing strip in a side view.

FIG. 3 shows a side view of a landing situation. The point 300 marks the position of an aircraft with an automatic landing system according to an exemplary embodiment of the invention. A landing strip 109 is also shown. The ideal line of approach is represented by the lines 301 and 302. The broken line 305 marks the so-called flare altitude or landing threshold starting at which the line of approach or the second approach segment 302 has a shallower approach angle 309 than the approach angle 306 of the first approach segment 301. The line 307 marks the extension of the first approach segment 301 and ends at the so-called target landing point 308.

Also shown are an altitude predefined by the landing system of the aircraft, as well as a decision window 303. The decision window 303 defines a spatial element whose extension is defined such that the aircraft lands with a very high degree of probability on the landing strip when it is passing through the decision window 304.

The control device of the landing system is designed to abort the landing approach of the aircraft if, at an altitude below the predefined altitude 304 when the aircraft is passing through the decision window 303, the first and second positional data differ from one another by more than a predefined amount and no decision has been made concerning the positional data to be used. Furthermore, the control unit is designed to abort the landing approach if the aircraft is below the altitude 304 and is not passing through the decision window 303.

Figure 4:
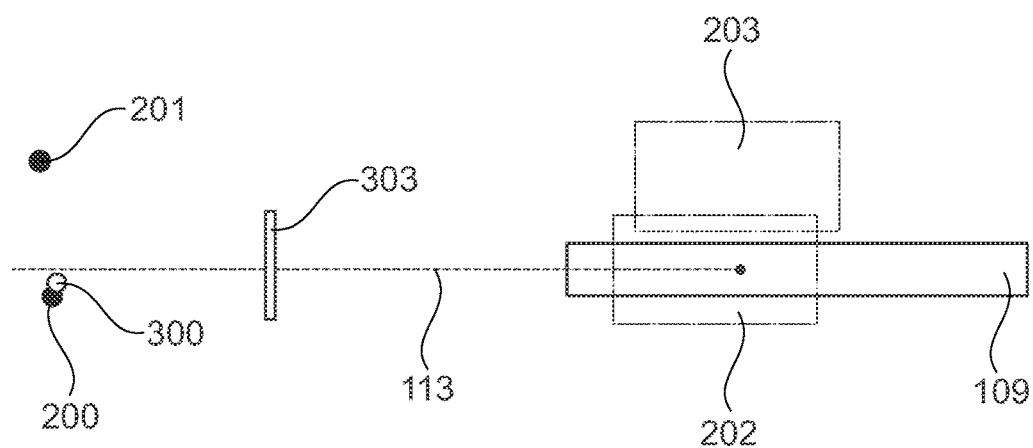
FIG. 4 shows a position of an aircraft according to one exemplary embodiment of the invention, as well as a landing strip in a top view.

FIG. 4 shows a top view of a landing situation in which the position 300 of an aircraft with a landing system according to one exemplary embodiment of the invention is shown. A landing strip 109 is also shown, and the line 113 marks the ideal landing approach.

As already described in the context of FIG. 2, first and second positional data 200 and 201 are shown that are determined by the first and second position or range measuring devices. The control device is designed to generate, based on the positional data 200 and 201, a first and second hypothesis, respectively, for a direction or range of a landmark, e.g., the landing strip 109, that are confirmed or discarded on the basis of the first and second images 202 and 203, as is described in detail in the context of FIG. 2.

The decision window 303 described in connection with FIG. 3 is also shown.

Figure 5:
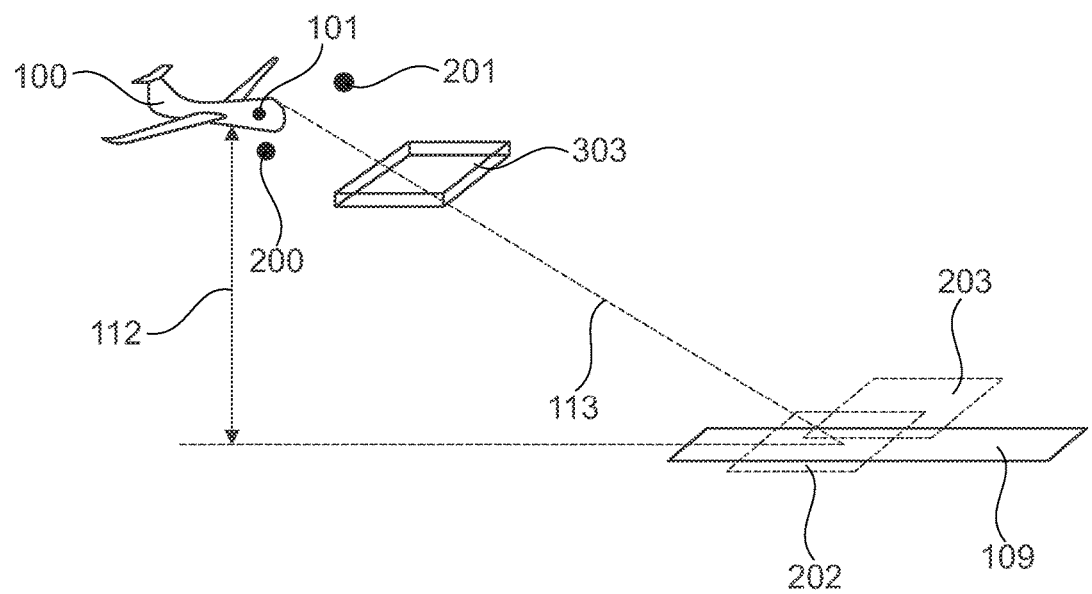
FIG. 5 shows an aircraft with an automatic landing system according to one exemplary embodiment of the invention, as well as a landing strip in a perspective view.

FIG. 5 shows a perspective view of an aircraft 100 with an automatic landing system 101 according to an exemplary embodiment of the invention. A landing strip 109 is also shown, with the ideal approach being shown by the line 113.

As already described in the context of FIGS. 2 and 4, the first and second positional data 200 and 201 are shown which are confirmed or discarded on the basis of the first and second images 202 and 203 detected by the sensor device. The decision window 303 described in the context of FIGS. 3 and 4 is also shown.

Figure 6:
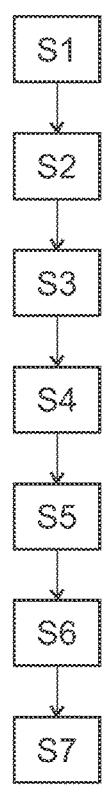
FIG. 6 shows a flowchart for a method according to an exemplary embodiment of the invention.

FIG. 6 shows a flowchart for a method for determining positional data of an aircraft for an automatic landing system of the aircraft according to one exemplary embodiment of the invention. The method comprises the step S1 of detecting first positional data of the aircraft through a first position or range measuring device and the step S2 of detecting second positional data of the aircraft through a second position or range measuring device. The method further comprises the step S3 of detecting sensor data from which a direction in which a landmark is located and/or a distance of the landmark to the aircraft can be determined, through a sensor device. The method further comprises the step S4 of generating a first hypothesis for the direction or range of the landmark based on the first positional data, as well as the step S5 of generating a second hypothesis for the direction or range of the landmark based on the second positional data. According to the method, the step S6 of confirming or discarding the first hypothesis and of the second hypothesis on the basis of the sensor data detected by the sensor device and the step S7 of deciding that only the positional data of the aircraft are to be used on which a confirmed hypothesis is based are carried out.

In addition, it should be pointed out that "comprising" or "having" do not exclude any other elements, and "a" or "an" does not exclude a plurality. Furthermore, it should be noted that features that have been described with reference to one of the above exemplary embodiments or embodiments can also be used in combination with other features of other exemplary embodiments or embodiments described above. Reference symbols in the claims shall not be regarded as limitations.

What is claimed is:

1. An automatic landing system for an aircraft, comprising:
    a control device configured to provide positional data for controlling the aircraft;
    a first position or range measuring device configured to detect first positional data of the aircraft;
    a second position or range measuring device configured to detect second positional data of the aircraft; and
    a sensor device configured to detect sensor data from which at least one of a direction in which a landmark is located and a range of the landmark to the aircraft can be determined,
    wherein the control device is configured to generate a first hypothesis for the determined direction or range of the landmark on the basis of the first positional data and a second hypothesis for the determined direction or range of the landmark on the basis of the second positional data,
    wherein the control device is configured to either confirm or discard the first hypothesis and the second hypothesis, respectively, using the sensor data detected by the sensor device, and
    wherein the control device is configured to determine that only positional data, on which a confirmed hypothesis is based, is to be used to control the aircraft.

2. The landing system as set forth in claim 1,
    wherein the control device, in order to check the first and second hypotheses, is further configured to determine a first correlation for the first hypothesis and the sensor data, as well as a second correlation for the second hypothesis and the sensor data, and
    wherein the control device is configured to confirm the hypothesis having a better correlation with the sensor data.

3. The landing system as set forth in claim 1, wherein the direction in which the landmark is located and the range of the landmark to the aircraft can be determined from the sensor data, and
    wherein the first and second hypotheses each constitute a hypothesis for the direction and the range of the landmark.

4. The landing system as set forth in claim 2, wherein the direction in which the landmark is located and the range of the landmark to the aircraft can be determined from the sensor data, and
    wherein the first and second hypotheses each constitute a hypothesis for the direction and the range of the landmark.

5. The landing system as set forth in claim 1, wherein the sensor device has a signal detection device for detecting electromagnetic signals of a signal source.

6. The landing system as set forth in any claim 1, further comprising:
    an altitude measuring device configured to determine a flight altitude of the aircraft,
    wherein the control device is configured to generate a third hypothesis for the flight altitude of the aircraft based on the first positional data and a fourth hypothesis for the flight altitude of the aircraft based on the second positional data,
    wherein the control device is configured to confirm or discard the third hypothesis and the fourth hypothesis, respectively, with the flight altitude determined by the altitude measuring device, and
    wherein the control device is configured to determine that only the positional data on which a hypothesis for the flight altitude of the aircraft that has been confirmed during the check is based are used to control the aircraft.

7. The landing system as set forth in claim 1,
    wherein the control device is configured to compare the first positional data and the second positional data; and
    wherein the control device is to determine which sensor data are not to be used for controlling the aircraft only if the first positional data and the second positional data differ from one another by more than a predefined amount.

8. The landing system as set forth in claim 2,
    wherein the control device is configured to compare the first positional data and the second positional data; and
    wherein the control device is to determine which sensor data are not to be used for controlling the aircraft only if the first positional data and the second positional data differ from one another by more than a predefined amount.

9. The landing system as set forth in claim 6,
    wherein the control device is configured to compare the first positional data and the second positional data; and
    wherein the control device is to determine which sensor data are not to be used for controlling the aircraft only if the first positional data and the second positional data differ from one another by more than a predefined amount.

10. The landing system as set forth in claim 1,
    wherein the control device is designed to abort a landing approach of the aircraft if, at an altitude below a predefined altitude, the first and second positional data differ from one another by more than a predefined amount and no determination has been made concerning the positional data to be used.

11. The landing system as set forth in claim 2,
wherein the control device is designed to abort a landing approach of the aircraft if, at an altitude below a predefined altitude, the first and second positional data differ from one another by more than a predefined amount and no determination has been made concerning the positional data to be used.

12. The landing system as set forth in claim 6,
wherein the control device is designed to abort a landing approach of the aircraft if, at an altitude below a predefined altitude, the first and second positional data differ from one another by more than a predefined amount and no determination has been made concerning the positional data to be used.

13. The landing system as set forth in claim 7,
wherein the control device is designed to abort a landing approach of the aircraft if, at an altitude below a predefined altitude, the first and second positional data differ from one another by more than a predefined amount and no determination has been made concerning the positional data to be used.

14. The landing system as set forth in claim 1,
wherein the first position or range measuring device is a satellite-based measuring device,
wherein the second position or range measuring device is a radar tracker or a laser tracker, and
wherein the sensor device has an optical camera, an infrared camera, an ultraviolet camera and/or a radar receiver for generating images.

15. The landing system as set forth in claim 2,
wherein the first position or range measuring device is a satellite-based measuring device,
wherein the second position or range measuring device is a radar tracker or a laser tracker, and
wherein the sensor device has an optical camera, an infrared camera, an ultraviolet camera and/or a radar receiver for generating images.

16. The landing system as set forth in claim 6,
wherein the first position or range measuring device is a satellite-based measuring device,
wherein the second position or range measuring device is a radar tracker or a laser tracker, and
wherein the sensor device has an optical camera, an infrared camera, an ultraviolet camera and/or a radar receiver for generating images.

17. The landing system as set forth in claim 7,
wherein the first position or range measuring device is a satellite-based measuring device,
wherein the second position or range measuring device is a radar tracker or a laser tracker, and
wherein the sensor device has an optical camera, an infrared camera, an ultraviolet camera and/or a radar receiver for generating images.

18. The landing system as set forth in claim 10,
wherein the first position or range measuring device is a satellite-based measuring device,
wherein the second position or range measuring device is a radar tracker or a laser tracker, and
wherein the sensor device has an optical camera, an infrared camera, an ultraviolet camera and/or a radar receiver for generating images.

19. A drone configured with a flight landing system, wherein the fight landing system comprises:
a control device configured to provide positional data for controlling the aircraft;
a first position or range measuring device configured to detect first positional data of the aircraft;
a second position or range measuring device configured to detect second positional data of the aircraft; and
a sensor device configured to detect sensor data from which at least one of a direction in which a landmark is located and a range of the landmark to the aircraft can be determined,
wherein the control device is configured to generate a first hypothesis for the determined direction or range of the landmark on the basis of the first positional data and a second hypothesis for the determined direction or range of the landmark on the basis of the second positional data,
wherein the control device is configured to either confirm or discard the first hypothesis and the second hypothesis, respectively, using the sensor data detected by the sensor device, and
wherein the control device is configured to determine that only positional data, on which a confirmed hypothesis is based, is to be used to control the aircraft.

20. A method for determining positional data of an aircraft for an automatic landing system of the aircraft, the method comprising the steps:
detecting, by a first position or range measuring device of the landing system, first positional data of the aircraft;
detecting, by a second position or range measuring device of the landing system, second positional data of the aircraft;
detecting, by a sensor device of the landing system, sensor data from which at least one of a direction in which a landmark is located and a range of the landmark to the aircraft can be determined;
generating, by a control unit of the landing system, a first hypothesis for the determined direction or range of the landmark based on the first positional data;
generating, by the control unit, a second hypothesis for the determined direction or range of the landmark based on the second positional data;
confirming or discarding, by the control unit, the first hypothesis and the second hypothesis, respectively, on the basis of the sensor data detected by the sensor device; and
determining, by the control unit, that only positional data, on which a confirmed hypothesis is based, is to be used to control the aircraft.

* * * * *